3,326,667
PREPARATION OF FERTILIZER SALTS WHICH ARE PRACTICALLY FREE OF CHLORINE AND SULFATE
Abraham H. de Rooij, Geleen, Netherlands, assignor to Stamicarbon N.V., Heerlen, Netherlands
Filed Apr. 3, 1964, Ser. No. 357,122
Claims priority, application Netherlands, Apr. 5, 1963, 291,228
5 Claims. (Cl. 71—39)

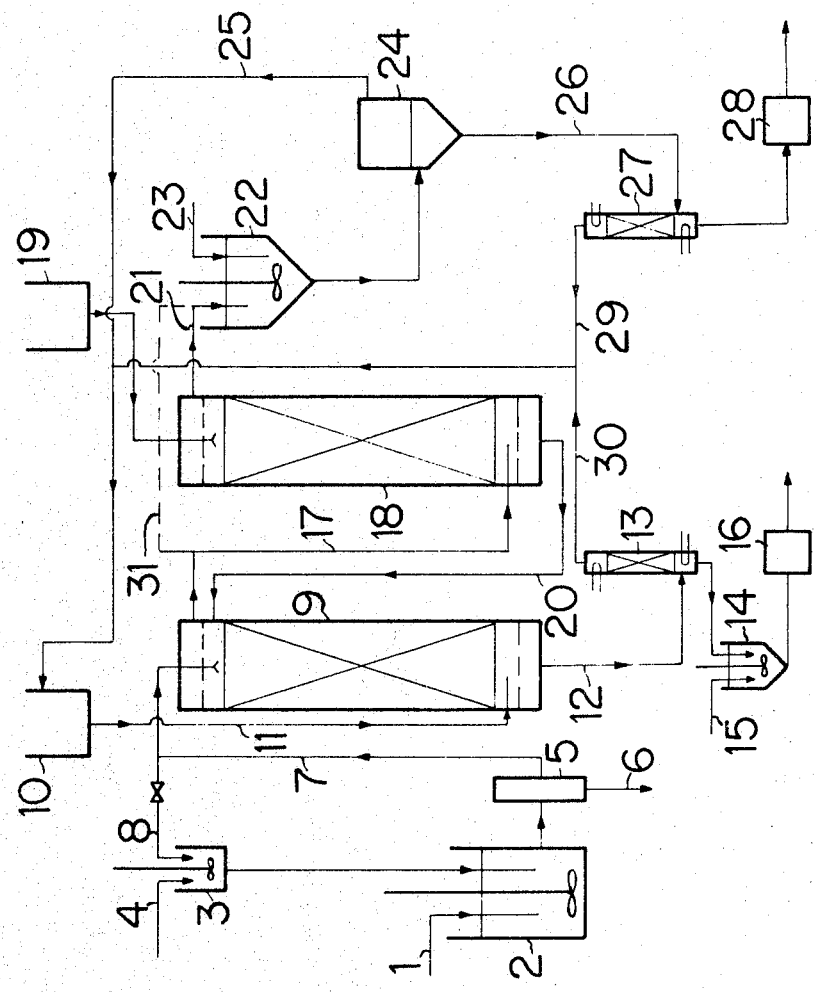

The present invention relates to the preparation of fertilizer salts which are practically free of chlorine and sulfate and contain one or more plant nutrients from the group of potassium, ammonia nitrogen, magnesium, nitrate nitrogen, and phosphorus in phosphate form, or of mixtures of such salts.

The process is applied to solutions obtained by decomposition of phosphate rock with an excessive amount—with respect to the amount of calcium contained in the phosphate rock—of concentrated nitric acid having a nitric acid content of at least 40% by weight. To these solutions, sulfates of potassium, ammonia or magnesium, or mixtures of these sulfates, have been added to precipitate the calcium in the form of gypsum and to remove it from the solution. In some cases part of the calcium has been separated from the solution prior to the addition of sulfate, e.g. by crystallization or by extraction with an organic solvent, as a result of which the amount of gypsum to be filtered off later—after the addition of sulfate—will be smaller. In this way a solution is obtained which, in addition to free nitric acid and phosphoric acid, contains the fertilizer salts referred to above.

The object of the present invention is to provide an efficient method of recovering these fertilizer salts from the solutions referred to above, and, more specifically, the invention effects separation between the dissolved salts and the dissolved free acid-nitric acid and phosphoric acid. During this separation, nitrate contained in the solution may also be converted into phosphate and free nitric acid by the action of free phosphoric acid.

According to the invention, this separation, and the conversion, if any, is effected if the solution is subjected to an extraction with a lower, poorly water-miscible, aliphatic alcohol with 4-6 carbon atoms, such as butyl alcohol, isobutyl alcohol, amyl alcohol, isoamyl alcohol or mixtures of such alcohols, as a result of which on the one hand the aliphatic alcohol and the nitric acid and phosphoric acid dissolved in it, and on the other hand an aqueous solution of nitrates and phosphates, is obtained. Owing to the fact that the extraction agent preferentially takes up nitric acid, the extraction will, depending on the nature of the extraction agent and the volumetric ratio between the extraction agent and the solution to be extracted, usually be attended with a partial conversion of nitrate and phosphoric acid into the phosphate and nitric acid.

The solution obtained in the extraction, which contains nitrates and/or phosphates, is stripped of extraction agent which has also been dissolved, and subsequently, by evaporation or, if so desired, by crystallization, processed to recover the corresponding salts or salt mixtures.

In the extraction the volumetric ratio between the extraction agent and the solution to be extracted may be varied widely. The extraction can, moreover, be carried out both as a continuous process in extraction columns, and as a discontinuous process in stirring vessels.

To effect a good separation between the salts and the free acids, a volumetric ratio of at least 1 part by volume of extraction agent to 1 part by volume of solution to be extracted is required; by preference, a volumetric ratio of 2.5 to 3.5 parts by volume of dry extraction agent to 1 part by volume of solution to be extracted will be used, if it is desired to effect a considerable degree of conversion of nitrate and phosphoric acid into phosphate and nitric acid. However, this conversion can be counteracted by extracting the solution with an extraction agent already containing nitric acid.

The conversion of nitrate and phosphoric acid into phosphate and nitric acid can be promoted by adding a lower aliphatic ketone to the extraction agent—consisting of lower aliphatic alcohols with 4 to 6 carbon atoms or mixtures of these alcohols—e.g. in the ratio of 2 parts by volume of alcohol to 1 part by volume of ketone. The application of methyl isobutyl ketone in particular, ensures not only a fairly complete conversion, but also a very selective separation between the salts and the free acids in the extraction.

Conversions of solutions containing salts and acids according to the equation $$MX + HY \rightleftharpoons MY + HX$$

with simultaneous extraction of the resulting acid HX, with an organic solvent, have been proposed before (see Belgian patent specification No. 556,751).

In this known process dilute solutions containing salts and acids are subjected to an extraction with an organic solvent. The present process does not relate to the extraction of dilute solutions containing salts and acids with the aid of an organic solvent but to the extraction of solutions obtained by decomposition of phosphate rock with an excessive amount—with respect to the amount of calcium contained in the phosphate rock—of relatively concentrated nitric acid having a nitric acid content of at least 40% by weight.

It has been found that the organic extraction agent is resistant to the concentrated phosphoric and nitric medium of the solutions to be extracted, even if the decomposition of the phosphate rock is effected for instance with 55%-by-weight nitric acid, provided the extraction temperature is kept below 40° C.

The process now will be described in detail with reference to the attached figure, which gives a diagrammatical representation of the process.

In the situation shown in the figure, the nitric decomposition liquor to be processed after the decomposition of the phosphate rock is, fed via conduit 1, to a reservoir 2, in which the solution is treated with a sulfate, or a mixture of sulfates, with conversion of the calcium nitrate present into gypsum and nitrate or a mixture of nitrates. Via supply pipe 4, the sulfate required is first fed to a reservoir 3, where it is dissolved in a solution freed from gypsum, which solution has been supplied via conduit 8.

The gypsum suspension formed in reservoir 2 is filtered in filtering device 5, while the gypsum is discharged via 6, and the mother liquor consisting of a solution of nitrate, or mixture of nitrates, nitric acid and phosphoric acid is fed to the top of an extraction column 9 via conduit 7. Part of this mother liquor is separated off via conduit 8 to dissolve sulfate in reservoir 3. In extraction column 9 the solution is extracted with an organic solvent which, via conduit 11, is fed from storage vessel 10 to the base of column 9. Via conduit 12, a solution which has been practically completely freed from free acids and substantially consists of nitrate and phosphate is discharged from the base of the extraction column and fed to a stripping column 13, where the entrained organic solvent is stripped off. The solution is then treated, in a neutralizer 14, with NH₃ supplied via conduit 15, to neutralize any free acid still present, after that freed from water in evaporator 16, and finally granulated to a fertilizer in a known way.

The organic solvent discharged from the top of extraction column 9, which solvent now contains nitric acid and phosphoric acid, is fed, via conduit 17, to the base of a second extraction column 18, where it is washed with a small amount of water, which is supplied from reservoir 19 to the top of the said column. The purpose of this washing is to remove any entrained nitrate. The nitrate-containing water is fed back to the top of extraction column 9 via conduit 20. The organic solvent containing the free acids is supplied, via conduit 21, to a neutralizer 22, there neutralized with $NH_3$ supplied via conduit 23, and finally fed to a separator 24. The neutralization causes a phase separation, resulting in the formation of an upper layer consisting of organic solvent, and a bottom layer consisting of a solution of the ammonium salts of nitric acid and phosphoric acid.

The upper layer is fed to the storage vessel 10 for the organic solvent via conduit 25; via conduit 26, the bottom layer is fed to a stripping column 27, where the organic solvent residues are stripped off. The salt solution is evaporated in device 28, and after that granulated to an N.P. fertilizer with 100%-water-soluble phosphate in a known way.

The amounts of organic solvent discharged from the top of the stripping columns 13 and 27 are fed to storage vessel 10 via the conduits 30 and 29, respectively. The water washing in the second extraction column can be omitted if the organic solvent discharged from the top of extraction column 9 is directly fed to neutralizer 22 via conduit 31. If, at the beginning of the process, potassium sulfate has been used for precipitating the gypsum, an N.P. fertilizer is then obtained which contains some potassium, but so little of it that this potassium has to be regarded as lost; this drawback is offset, however, by the advantage that less water has to be evaporated in evaporator 16.

The above-described extractions can be carried out in normal columns filled with packing bodies or in plate columns; by preference, the liquids are made to pulsate in the column.

*Example 1*

905 kg. of $K_2SO_4$ was added to 6000 kg. of solution which had been obtained by decomposition of phosphate rock with nitric acid, and from which part of the dissolved calcium nitrate had been removed by extraction, as a result of which the solution contained 853 kg. of $Ca(NO_3)_2$, 360 kg. of $HNO_3$ and 1080 kg. of $H_3PO_4$ in 3700 kg. of $H_2O$. Consequently, 705 kg. of $CaSO_4.\tfrac{1}{2}$ aq. could be filtered off.

The liquid filtered off (6200 kg.), which contained 1050 kg. of $KNO_3$, 1080 kg. of $H_3PO_4$, 360 kg. of $HNO_3$, and 45 kg. of still dissolved gypsum, was fed to the top of column 9 together with 430 kg. of washing liquid, and extracted there with 13,100 kg. of hydrous butanol (1350 kg. of $H_2O$).

From the base of column 9, 4270 kg. of solution was discharged, from which 110 kg. of butanol was stripped off in stripping column 13; the solution was neutralized with 31 kg. of $NH_3$ in neutralizer 14. After evaporation 1400 kg. of fertilizer was obtained, which mainly consisted of 740 kg. of $KNO_3$, 410 kg. of $KH_2PO_4$, 211 kg. of $NH_4H_2PO_4$, by the side of 45 kg. of $CaSO_4$, i.e. an N.P.K. fertilizer containing 9.2% by weight of N,
24.5% by weight of $P_2O_5$,
34.5% by weight of $K_2O$.

The butanol extract (15,460 kg.) discharged from the top of column 9 was washed with 2460 kg. of water in column 18. From the top of column 18, 17,500 kg. of butanol extract was discharged, which contained 4690 kg. of water, 5 kg. of $KNO_3$, 600 kg. of $H_3PO_4$, and 550 kg. of $HNO_3$.

Via conduit 17, 430 kg. of washing liquid was discharged from the base of column 18 and fed to the top of column 9. The butanol extract discharged from column 18 was neutralized with 253 kg. of $NH_3$ in neutralizer 22. After separation of the butanol and the salt solution in separator 24, stripping off the still dissolved butanol, and evaporation in evaporator 28, 1410 kg. of an N.P. fertilizer consisting of ammonium phosphate and ammonium nitrate (21.2% by weight of N and 30.8% by weight of $P_2O_5$) was obtained.

*Example 2*

If the 6200 kg. of filtered-off liquid of Example 1 is introduced into the top of column 9 together with 376 kg. of washing liquid, and there extracted with 13,000 kg. of a mixture of butanol, methyl isobutyl ketone and water, containing 1800 kg. of $H_2O$ and 4000 kg. of methyl isobutyl ketone, an amount of 5040 kg. of solution is obtained from the bottom of column 9, from which solution 100 kg. of butanol and 10 kg. of methyl isobutyl ketone are removed by stripping in a stripping column 13. After neutralization with 34 kg. of $NH_3$ in neutralizer 14, followed by evaporation of the liquid, 1500 kg. of N.P.K. fertilizer is obtained, consisting of 5550 kg. of $KNO_3$,
671 kg. of $KH_2PO_4$,
229 kg. of $NH_4H_2PO_4$,
45 kg. of $CaSO_4$, i.e. an N.P.K. fertilizer with 7% by weight of N, 33% by weight of $P_2O_5$, and 33% by weight of $K_2O$.

If the liquid discharged from the bottom of column 9 is again extracted with 9750 kg. of the mixture of butanol, methyl isobutyl ketone and water, followed by stripping, neutralization and evaporation, an amount of 1315 kg. of N.P.K. fertilizer is eventually obtained, consisting of 421 kg. of $KNO_3$,
846 kg. of $KH_2PO_4$,
2 kg. of $NH_4H_2PO_4$,
45 kg. of $CaSO_4$, i.e. an N.P.K. fertilizer containing 4.5% by weight of N,
33.7% by weight of $P_2O_5$,
37.2% by weight of $K_2O$.

*Example 3*

Instead of 905 kg. of $K_2SO_4$, 418 kg. of $K_2SO_4$ and 370 kg. of $(NH_4)_2SO_4$ were now added to the starting solution used in Example 1. The gypsum formed was filtered off, and the solution freed from gypsum, which solution (6050 kg.) contained 480 kg. of $KNO_3$, 440 kg. of $NH_4NO_3$, 1080 kg. of $H_3PO_4$, 360 kg. of $HNO_3$, and 46 kg. of still dissolved gypsum, was extracted in column 9 with 20,000 kg. of nitric acid-containing butanol consisting of 1400 kg. of $HNO_3$, 3050 kg. of $H_2O$, and 15,550 kg. of butanol. In this way a good separation was effected between the nitrates on the one hand, and the free acids on the other hand; from the base of column 9, 3770 kg. of solution was discharged, from which 70 kg. of butanol was stripped off; the solution was neutralized with 8.9 kg. of $NH_3$.

The neutralized solution was evaporated and yielded 910 kg. of a fertilizer mixture mainly consisting of $KNO_3$ and $NH_4NO_3$ (22.8% by weight of N by the side of 23.5% by weight of $K_2O$).

The butanol extract discharged from the top of column 9 was neutralized with 651 kg. of $NH_3$; after separation of the butanol and the salt solution in separator 24, stripping off still dissolved butanol, and evaporation, about 3500 kg. of an N.P. fertilizer mainly consisting of ammonium phosphate and ammonium nitrate (22% by weight of N and 22% by weight of $P_2O_5$) was obtained.

What is claimed is:

1. A process for producing from phosphate rock fertilizer salts which are practically free of chlorine and sulfate and which contain at least one plant nutrient selected from the group consisting of potassium, ammonia nitrogen, magnesium, nitrate nitrogen and phosphate, comprising (1) decomposing said phosphate rock with an excessive amount of aqueous, concentrated nitric acid having a nitric acid content of at least 40% by weight, (2) adding to the resultant solution of decomposed phosphate rock a sulfate of at least one member of the group consisting of potassium, ammonia and magnesium to form (a) an aqueous solution of free nitric and phosphoric acid and nitrate and phosphate fertilizer salts having as their positive radical the cation of said added sulfate and (b) a precipitate of gypsum, (3) removing said gypsum, (4) contacting said aqueous solution with at least one lower, poorly water-miscible, aliphatic alcohol which contains 4–6 carbon atoms to form an aqueous phase containing said aqueous solution and said fertilizer salts, and an alcohol phase containing said free nitric and phosphoric acids, (5) separating said alcohol phase from said aqueous phase, (6) neutralizing said aqueous phase, and (7) recovering said fertilizer salts therefrom.

2. A process according to claim 1, in which said alcohol contains, in admixture therewith, at least one lower aliphatic ketone to increase the conversion of nitrates and phosphoric acid to nitric acid and phosphates.

3. A process according to claim 1 in which the fertilizer salts are recovered from said aqueous phase by evaporation.

4. A process according to claim 1 in which there is used at least 1 part by volume of said alcohol for each part by volume of said aqueous solution.

5. A process according to claim 1 including removing any alcohol from said aqueous phase prior to recovering said fertilizer salts.

References Cited

UNITED STATES PATENTS

| | | | |
|---|---|---|---|
| 1,981,145 | 11/1934 | Keller | 23—312 X |
| 2,880,063 | 3/1959 | Baniel et al. | 23—312 X |
| 2,885,265 | 5/1959 | Cunningham | 23—165 |
| 2,914,380 | 11/1959 | Vickery | 23—109 |
| 3,245,777 | 4/1966 | Chang | 71—39 |

OTHER REFERENCES

Baniel, A., et al.: "Phosphoric Acid by Liquid-Liquid Extraction," in British Chemical Engineering, vol. 4, No. 4 (April 1959), pp. 223–224.

Waggaman, Wm. H.: Phos. Acid, Phosphates and Phosphatic Ferts., 2d ed., Reinhold Publ. Corp., N.Y. (1952), page 348.

DONALL H. SYLVESTER, *Primary Examiner.*

T. D. KILEY, *Assistant Examiner.*